United States Patent
Brennan et al.

(10) Patent No.: US 8,239,831 B2
(45) Date of Patent: Aug. 7, 2012

(54) VISUAL INTERFACE FOR AUTOMATED SOFTWARE TESTING

(75) Inventors: James M. Brennan, Troy, MI (US); Ergin A. Salih, Commerce Township, MI (US); Khalil N. Harfouch, Rochester Hills, MI (US); Russ D. Faubert, Holly, MI (US)

(73) Assignee: Micro Focus (IP) Limited, Newbury (GB)

( * ) Notice: Subject to any disclaimer, the term of this patent is extended or adjusted under 35 U.S.C. 154(b) by 1698 days.

(21) Appl. No.: 11/548,572

(22) Filed: Oct. 11, 2006

(65) Prior Publication Data
US 2008/0127095 A1    May 29, 2008

(51) Int. Cl.
*G06F 9/45* (2006.01)
(52) U.S. Cl. .................................................. 717/124
(58) Field of Classification Search .................. 717/124
See application file for complete search history.

(56) References Cited

U.S. PATENT DOCUMENTS

| | | |
|---|---|---|
| 5,790,117 A | 8/1998 | Halviatti et al. |
| 5,959,633 A | 9/1999 | McFarland |
| 6,038,378 A * | 3/2000 | Kita et al. .................. 714/38.11 |
| 6,046,741 A | 4/2000 | Hochmuth |
| 6,192,512 B1 | 2/2001 | Chess |
| 6,810,364 B2 | 10/2004 | Conan et al. |
| 7,966,604 B2 * | 6/2011 | Tomar ........................... 717/127 |
| 2002/1018889 | 12/2002 | Shupps et al. |
| 2003/0005413 A1 * | 1/2003 | Beer et al. ..................... 717/125 |
| 2004/0268334 A1 * | 12/2004 | Muthukumar et al. ....... 717/160 |
| 2007/0240118 A1 * | 10/2007 | Keren ........................... 717/124 |
| 2008/0066009 A1 * | 3/2008 | Gardner et al. ............... 715/809 |

OTHER PUBLICATIONS

E-Test Suite for Integrated Web Testing, Empirix, pp. 1-7, Empirix.
IBM Rational Functional Tester, Rational Software, On Demand Business, 2004, pp. 1-4, IBM Corporation.
Mercury: Functional Testing: Mercury Quicktest Professional, 2006, 2 pages, Mercury Interactive Corporation.
Mercury: WinRunner, 2006, 2 pages, Mercury Interactive Corporation.
SilkTest, Segue 2006, 2 pages, Segue Software, Inc.
Worksoft: Certify. Progressive Automated Software Testing, Worksoft Test Progressive, 2006, 2 pages, Worksoft, Inc.
Worksoft Whitepaper, Worksoft Test Progressive, 2005, 8 pages, Worksoft, Inc.

* cited by examiner

*Primary Examiner* — John Chavis
(74) *Attorney, Agent, or Firm* — DLA Piper LLP US

(57) ABSTRACT

A system and a method of providing a visual interface for creating, maintaining, and reviewing the results of, automated functional tests of software applications that includes screen views for each window automated within the application under test. The system and method provide a visual interface for creating and modifying functional tests of software applications geared for novice users. The visual interface includes a screen preview, test steps, properties and a storyboard. A test logic builder interface enables novice users to add logic, including verification and synchronization, to their visual test transactions without having to understand programming concepts.

23 Claims, 13 Drawing Sheets

| Results | | | | | |
|---|---|---|---|---|---|
| Result | Report | Cycle | Status | Verification | Flag |
| Mixed | Summary | -- | Mixed: successful, failed, incomplete | 7/36 verifications failed | |
| Passed | testScript | 113 | Completed successfully | 0/12 verifications failed | |
| | | | | | |
| Failed | TP_032305 | 2 | Failed to complete | -- | |
| Passed | threshold_test | 18 | Completed successfully | 1/12 verifications failed | |

<toolbar>

| 1 | 0 | 4 | 11 | 12 | 0 | Details |

| Result | Report | Cycle | Status | Verification | Flag |
|---|---|---|---|---|---|
| Mixed | Summary | -- | Mixed: successful, failed, incomplete | 6/12 verifications failed | |
| | Success criteria: | Run completed; Verification > 90%; 0 Errors | | | edit |
| | Playback settings: | Smoketest enabled | | | edit |
| | Start: | 11:54 AM - 03/23/05 | | | |
| | End: | 12:36 PM - 03/23/05 | | | |
| | Length: | 00:42:11 | | | |

Fig. 4

VISUAL INTERFACE FOR AUTOMATED SOFTWARE TESTING

BACKGROUND OF THE INVENTION

1. Field of the Invention

This invention relates generally to automated testing of computer software programs and more particularly to automated software quality through automated functional testing using graphical user interfaces.

2. Description of the Related Arts

Software developers commonly spend a great deal of time and money testing the computer programs they develop. This is especially true for development of so-called "mission critical" programs, such as those used in business accounting, payroll and billing systems.

Software testing is viewed as an obstacle to production because it is time consuming and the costs of not testing are theoretical and uncertain. Consequently, software testing is often neglected. One way to balance deployment time with higher software quality resulting from thorough testing is to make testing and development as efficient as possible.

As software becomes increasingly more complex, testing the software also becomes more complex as a large number of unique combinations of paths and modules may be tested for each program. One approach to software testing is to create a test script for testing a software application. These scripts are conventionally written in a general purpose programming language such as Visual Basic, C++ or Java, or in a proprietary language focused on test scripts. The scripts abstractly represent actions that are to be performed by the application under test. The scripts themselves, like computer programs, are compiled and then executed against the application under test.

Conventional approaches that call for creation of test scripts require users to have technical expertise to understand the scripts they are writing, editing and executing. Maintaining test scripts and interpreting test results can be inefficient because of the abstraction inherent in scripting. Users cannot "see" what they are trying to do with the application being tested, and as a result they sometimes spend significant amounts of time identifying required changes and verifying that changes function as expected.

In one previous attempt to address the challenges of scripted testing, a software tool called Mercury QuickTest Pro provides a "screenshot" view that gives users a visual context for creating and maintaining test scripts while seeing the controls they are manipulating. A tree and grid interface textually describes the actions relative to the screenshot view. However, the user is not provided with a visual interface for understanding the relationship of each action and each window to the overall scope of the script. Rather, a hierarchical tree view indicates the relationship of each window to each step in the test script. Thus, the user must still deal with significant abstraction. Further, technical language is still used in much of the text presented to the user, making it difficult for non-technical personnel to make use of such tool. Finally, since such tool is script-based, translation between the visual interface and a script remains a requirement.

Some approaches to "scriptless" automated testing have previously been made. For example, the CERTIFY product produced by Worksoft, Inc. of Dallas, Tex. is marketed as using a "progression testing" approach that requires no scripts or other programming. An expert has to develop a testing execution engine for at least some environments. The engine accepts a limited set of Keywords to be input from tables. The test processes, then, are defined based on the tables. The items in the tables include objects (e.g., "NewBtn PushButton"), actions (e.g., "Press"), descriptions (e.g., "Press NewBtn PushButton"), and what to do on pass or on fail (e.g., "Continue").

Similarly, published United States Patent Application No. US 2002/0188890, entitled, "System and Method for Testing an Application", discloses that testing can be performed using "scriptless" transactions. As described in the abstract, "The transaction definition may occur during navigation by a user through a network site while data regarding application is collected. Alternatively, a user may select transactable components or transactions from a list or a group of icons. In still another alternative the transaction definition may be performed automatically using log files or component relationship data."

Another existing solution, the TestPartner product from assignee Compuware Corporation, includes a tool called the Visual Navigator that simplifies some of the more arcane aspects of creating, executing, and managing scripts.

Notwithstanding existing approaches to making application testing easier for non-technical users, challenges have remained. Usability of testing products for complex applications is still capable of improvement, particularly with regard to providing visual context. The majority of tools are entirely textual in terms of how they present the application under test and the action to be performed against it. An improvement in the visual context is particularly useful for personnel who are non-technical or new to software quality/testing disciplines. This is an important need because it is often Subject Matter Experts (SMEs) for a particular application that could best serve as testers for such application, yet such SMEs are rarely qualified to serve as software quality assurance testers using existing test products.

Therefore, there is a need to have improved systems and processes for scriptless automated software testing.

SUMMARY OF THE INVENTION

To address the above, in accordance with the present invention a system and a method for software testing and quality assurance provides a visually oriented interface that includes actual screen views for each window that is automated within the application under test.

In one embodiment, the system captures a screen shot of each window against which it records user actions, and then matches up the known starting point of the screen shot with the known location of enumerated controls within the window. This information is stored in conjunction with the screenshot. Accordingly, the user is able to review the exact screens being automated, as well as the flow of information; identify all supported controls on each window; edit existing transactions, also called "Visual tests", including adding new control information visually; and perform such actions even when the application under test is not itself available (e.g., when it is off line). In some embodiments, a screen is displayed to notify the user when recording of a new visual test has begun.

In a further aspect of the invention, a visual interface geared for novice users includes an application window, also called "Screen Preview", an action window, also called test steps, a properties window and a storyboard window. The application window is a screen shot of the window being automated in the application under test. The action window is a list of actions displayed within the application window, as well as logic that occurs within the context of the transaction but does not directly manipulate the graphical user interface of the application under test. The properties window displays the attributes associated with an item or step the user selects. The storyboard window shows a sequence of application windows being automated. In one embodiment, the application window appears to the left of the action window, the property window below the application window and the storyboard window appears below the property and action windows. In a further embodiment, the storyboard window uses "thumbnail" screenshots to depict the windows under automation.

In another aspect, highlighting within the application window, the action window and the storyboard window is synchronized so as to help direct the user to the appropriate context for any particular portion of the testing. For example, when a user selects a particular action in the action window, the corresponding graphical user interface component of the application under test is highlighted in the application window, as is the appropriate "thumbnail" in the storyboard window.

In yet another aspect, actions are visually editable regardless of whether the application under test is actually available. In one embodiment, the user performs such editing directly in the application window and in another the user is given the option of editing offline and updating on a screen-by-screen or application-by-application basis when online. In this manner, the user does not need to locate and execute the actual application under test every time a change is made to the desired testing procedure.

In still another aspect, usability of the action window is increased by application of relatively non-technical language in that window, a simple syntactical structure (e.g., <action><object>), and inclusion of visually descriptive icons in the action window's list of actions.

Also in accordance with the present invention, a results window includes a portion with a list of tests executed and a context-sensitive portion providing further details. In one aspect, such results are broken down into simple to understand levels of severity including errors, warnings, and informational messages. Categorization of such levels is user-controllable on an individual basis as well as globally, to permit the user or an administrator to modify levels as may be needed.

In still another aspect, the context-sensitive portion of the results window displays application, action, property and storyboard portions to visually show what happened during execution of a particular test.

Further in accordance with the present invention, a startup window for each user integrates recent transactions; new transactions; assigned tasks, notes and other collaboration information; support and "getting started" information to enhance usability.

Still further in accordance with the present invention, the system is configured to allow a user to flag elements for follow-up directly in the results or transaction window, and to allow a user to annotate with text, voice, or file attachments directly in the application window.

The system is also configured to allow a user to add notes to the results or transaction widows. Flags are to facilitate collaboration between users, and notes are for informational purposes.

The system permits a user to print tests, results, screenshots and descriptions. The print dialog allows users to decide how much information they wish to print. For example, users may select to print all associated screens, or only selected items.

The features and advantages described in the specification are not all inclusive and, in particular, many additional features and advantages will be apparent to one of ordinary skill in the art in view of the drawings, specification, and claims.

Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. ("FIG.") 1 illustrates a visual interface geared for novice users to control the automation of an Application Under Test (AUT) which includes an Application Window, an Action Window, and a Storyboard Window in accordance with one embodiment of the present invention.

FIG. 4 illustrates the results window in which the numbers on each tab and the data displayed within the lower results pane is contextually dependant on the line selected in the upper results pane, in accordance with one embodiment of the present invention.

DETAILED DESCRIPTION OF THE PREFERRED EMBODIMENTS

The Figures ("FIG.") and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Figure 12:
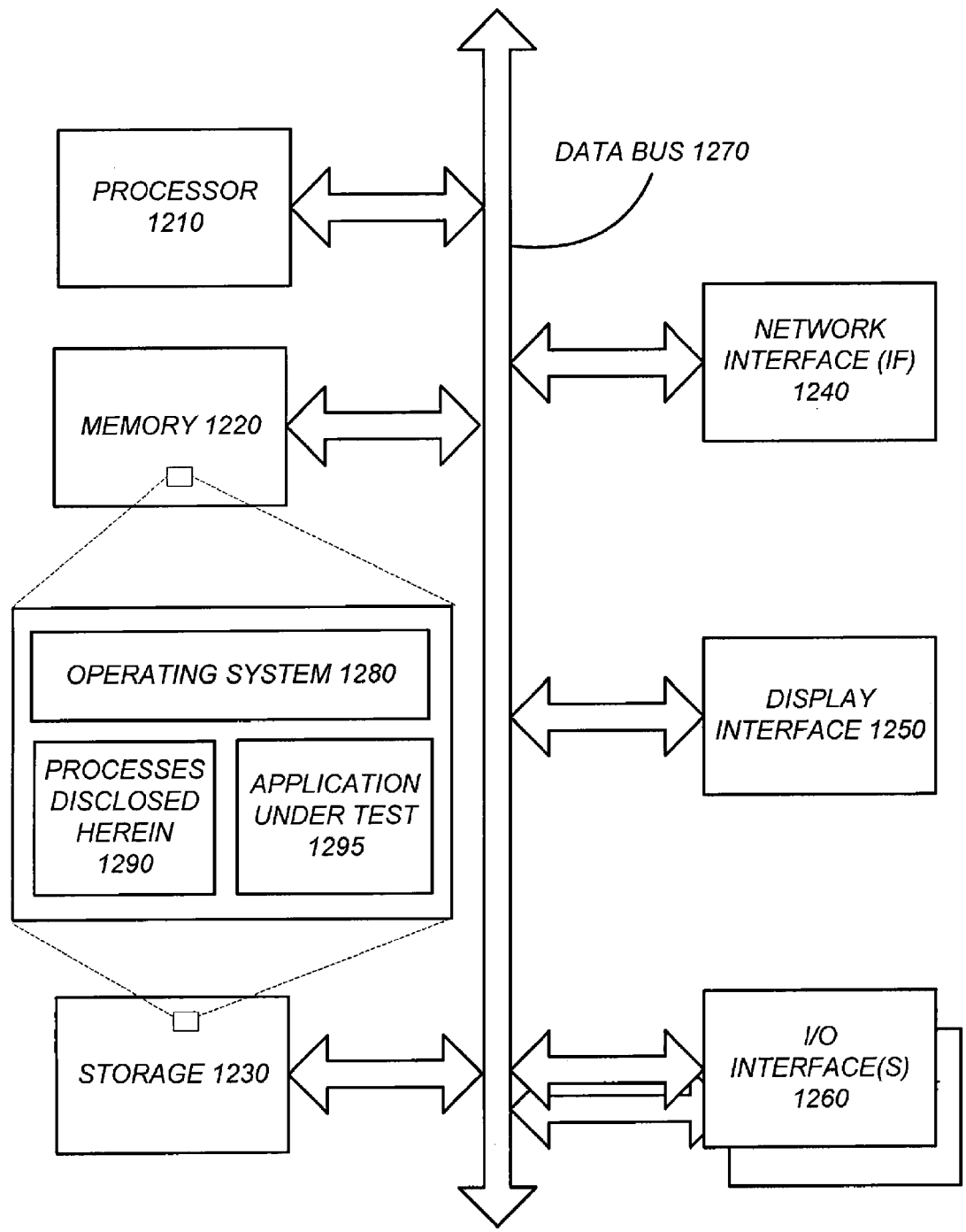
FIG. 12 illustrates a programmed computer in accordance with one embodiment of the present invention.

The present invention includes a system and a method for providing a visual interface for creating, maintaining, and, reviewing the results of, automated functional tests of software applications. The system includes actual screen views for each window that is automated within the application under test. FIG. 12 illustrates an overall flow diagram of one embodiment of this invention with the processes disclosed herein 1290 in one embodiment stored in the storage medium 1230 of a computer, and then copied to memory 1220 during execution.

FIG. ("FIG.") 1 illustrates an embodiment with a visual interface 10, geared for novice users, which includes an Application Window 100, an Action Window 102, a Properties Window 126, and a Storyboard Window 104. The Application Window 100 is the primary visual interface that the "novice" user interacts with to control the automation of each window within the Application Under Test (AUT). It is generated by capturing a screen image 106 of each application window being automated in the AUT. Since the invention knows the coordinates of the application window and all supported controls within it 108, and since the screenshot 106 originates from a known screen position, the list of enumerated controls can be matched to the screen image accurately. The application window matches the known starting point of the screenshot with the known locations of the enumerated controls 108 within the window. This information is stored in conjunction with the screenshot.

As a result, the user can interact with the screenshot of the application (offline) in much the same way that they would interact with the application itself. The user is then able to perform a variety of actions without any consideration for whether the actual application under test is currently offline or unavailable. These actions include reviewing the exact screens being automated, reviewing the flow of automation, identifying all supported controls on each window, editing existing transactions and adding new control automation visually. The user also is able to inspect the controls displayed, click on a control and modify its automated behavior, and create a verification to test the properties found within a control on the application.

The Action Window 102 is a "list-based" interface that presents users with a sequential, textual list 110 of the actions that occur within the transaction. It also provides users with an interface for modifying actions 112. In one embodiment, the Action Window 102 also allows the user to insert logic— commands that do not directly manipulate the GUI of the application under test, but which occur within the flow of the transaction.

The language used within the Action Window is both simple and plain, as opposed to being codelike or technical jargon. Because (1) the Application Window visually provides the context of the actions, (2) the system knows what kind of control it is automating, and (3) the point of automation is visually specified in the Application Window, a relatively complex sequence of code that would be used in a script based testing environment is reduced to a single, fairly simple action within the Action Window, for example "Select 'Bauhaus 93'" 114.

After a transaction is recorded, the Application Window 100 works in conjunction with the Action Window 102 to present the user with the sequence of recorded actions. If an action is selected 114 within the Action Window, the corresponding control 116 is highlighted within the Application Window. This enables the user to quickly associate the action 114 with the application control 116 being automated, even if the application under test is not running.

The Storyboard Window 104 presents users with the visual sequence of windows being automated 118, and numeric data 120 that provides the relationship between each window and the recorded actions. Each window is depicted as a thumbnail and the windows are arranged in the linear order in which they are automated within the transaction. The number above each window 120 relates the numeric sequence of actions performed against each window, and it correlates with the numbers 122 listed in the Action Window.

The Storyboard windows 118 have three primary purposes. First, they allow the user to visually understand order of windows and actions being executed. The windows provide a miniature visual representation of each window under automation, enabling users to more quickly find a particular point (window) in the automation sequence. Second, the windows allow users to move quickly among windows. By moving window-to-window, the user can quickly navigate through, or jump over, a large number of actions. Third, the windows allow users to quickly and easily rearrange the order that the windows are automated. Users can copy, paste, and drag and drop entire windows and their associated sequence of actions.

When a window in the transaction is highlighted 124 within the Storyboard Window, the corresponding lines 114 within the Action Window are also highlighted at once. Similarly, if an item 114 in the Action Window is selected, the corresponding window 124 within the Storyboard is highlighted.

Figure 1:
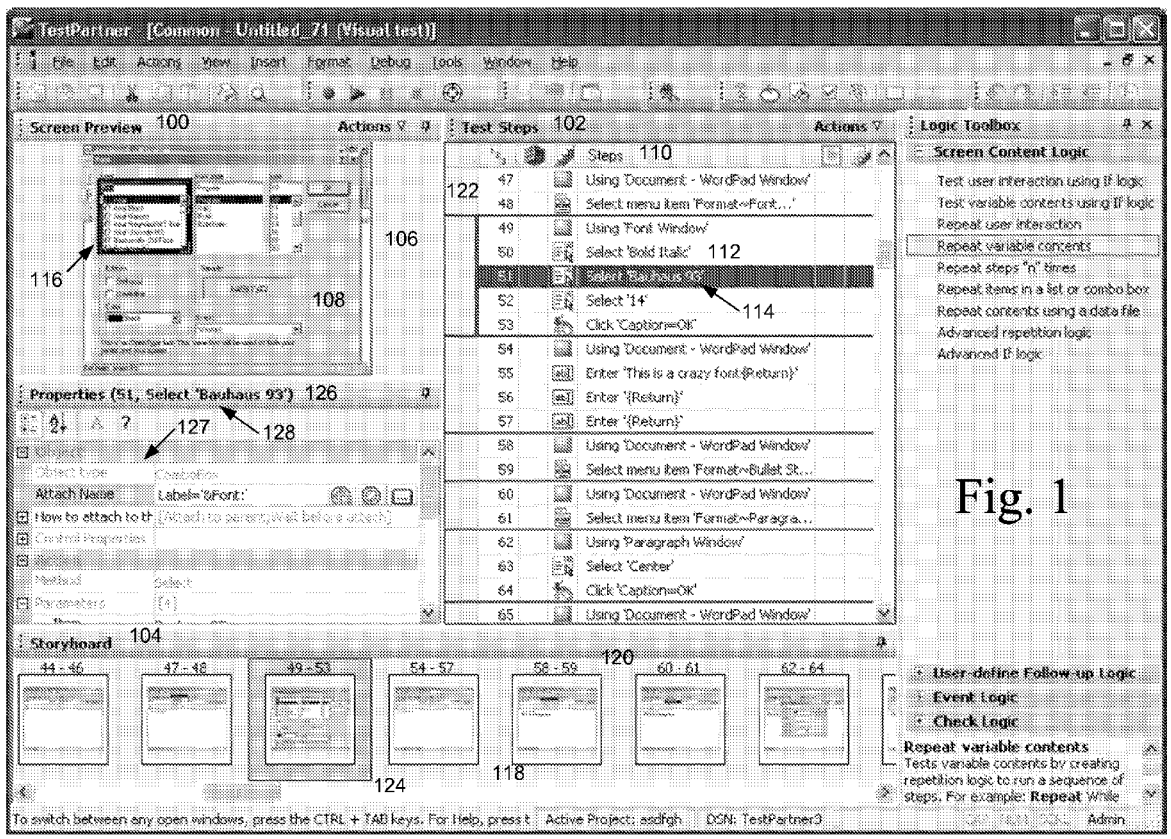

In some embodiments, a "Properties" window is provided. In FIG. 1, Properties Window 126 appears below application 100. Properties Window 126 lists various action items 127 and displays properties of any selected action item 128. In one embodiment, selecting an action item also allows the user to edit that action item. Users may also add descriptions to items through the Properties window.

The Properties Window 126 allows a user to interact with a selected item. If a variable or active data value is selected, the user may edit the item through the Properties Window.

Other user interface mechanisms helpful to end-users, and particularly novice end users, are provided in accordance with the present invention. In various embodiments, windows 100, 102, 104, 126 include "header" areas with selection mechanisms (e.g., drop-down menus, icon bars, test logic toolbox) permitting users to readily select tasks pertinent to the windows they are looking at.

To further assist users in cataloging the results of a visual test, a playback dialog is presented on one embodiment that allows a user to set whether the log will be saved into a new test result, overwrite the existing test result or append to the old test result.

A playback window further allows a user to select how often the program will export results. Options provided to the user include always, only when a test fails, and never.

Creating and Modifying Transactions

Figure 6:
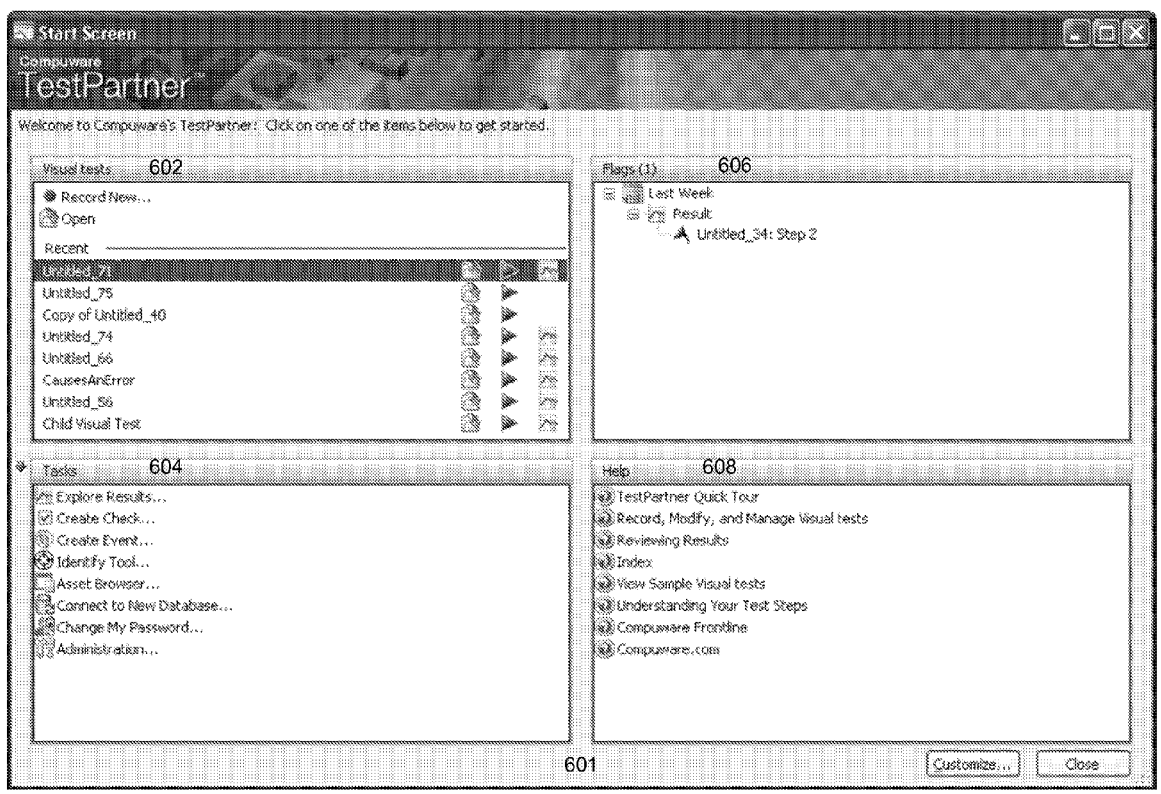
FIG. 6 illustrates an initial task based interface, called the Start Screen, which allows users to select from variety of initial tasks to perform in accordance with one embodiment of the present invention.

Referring now to FIG. 6, to create a transaction, or "visual test," the user selects the "Record New . . . " 604 option from the Start Screen 601. The user interface then transitions to record mode. The Application, Action, and Storyboard windows are presented to the user as in FIGS. 1 and 2. From here they can modify their transaction as desired. The user can also choose to execute their transaction or return to the Start Screen interface 601 to choose another task.

Figure 2:
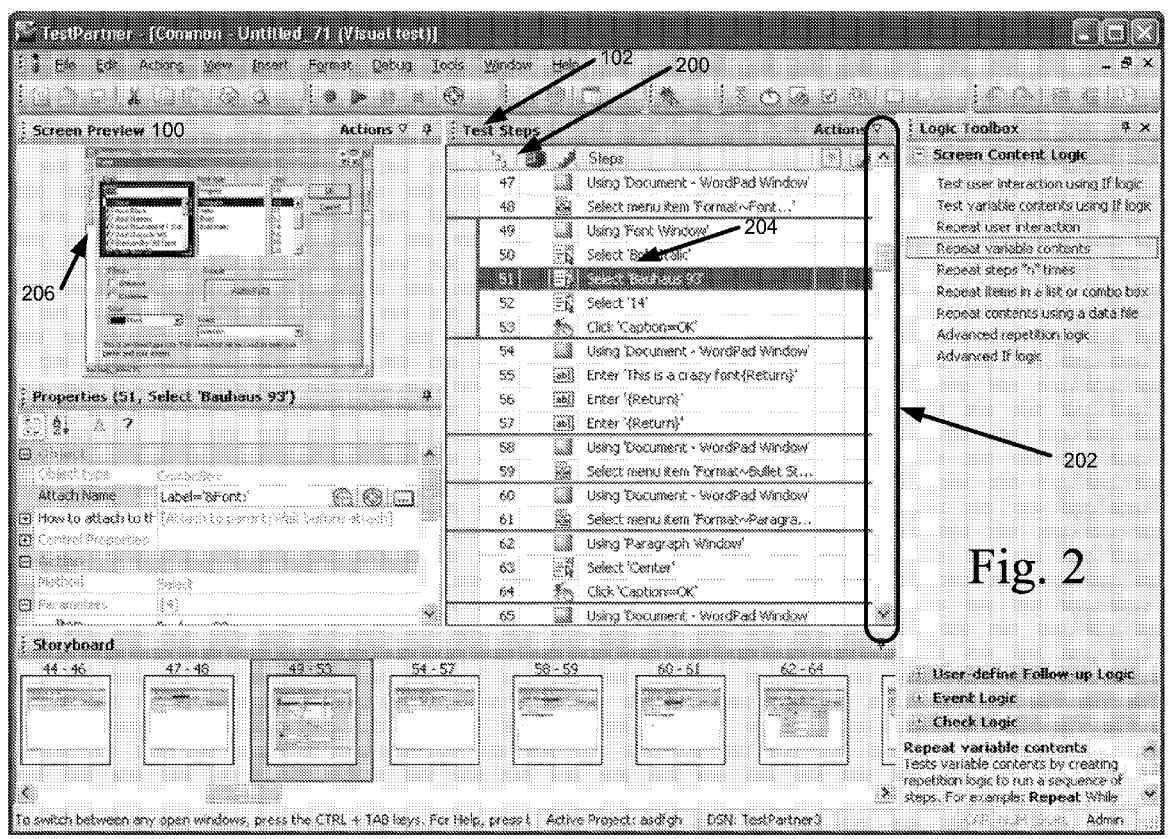
FIG. 2 illustrates one step in the method of using the visual interface shown in FIG. 1 to modify transactions of an automated functional test, where the action being modified is selected, in accordance with one embodiment of the present invention.

Referring to FIGS. 1 and 2, the Application 100 and Action 102 Windows provide users with the ability to easily edit existing transactions. From directly within these windows, users can add, edit, move/reorder, copy/duplicate, or delete steps within the sequence of recorded actions 110. The user can delete all actions associated with an entire screen. In the case of editing, the user can modify transactions in offline mode. This is because the system preserves property, enumeration, and visual information of the test. To edit, the user opens the transaction and selects the action to modify 200. As long as the application screen and controls remain the same, a wide variety of actions can be modified without having access to the application under test.

The invention provides the user with multiple ways to edit an existing action. These include: (1) Selecting a step from the Action Window 200, then modifying it through the Properties window 126 (2) Scrolling upward/downward in the Action Window using the scrollbars 202, highlighting the appropriate item 200, and then modifying the step 204. (3) Tabbing through the automated controls 108 in the Application Window 100 and selecting a popup menu that allows the user to modify the action performed against this control.

Users can also elect to add a new step to the sequence of actions recorded against a given screen. For example, to accomplish this via the Action Window, the user selects the step prior to where they want to add the new action, and then right-clicks to select a pop-up "Insert" menu option to insert "Control From" the "Application Under Test" or "Application Window." The user then selects the control to be automated, selects the action, and specifies any pertinent data that may need to be entered, such as the text to be typed into an edit control. A system in accordance with the invention also allows users to delete, copy, cut, and paste actions in a similar manner. In some embodiments, the system allows a user to repeat actions based on the value of a control property by selecting a corresponding user interface option.

Result Window

Figure 3:
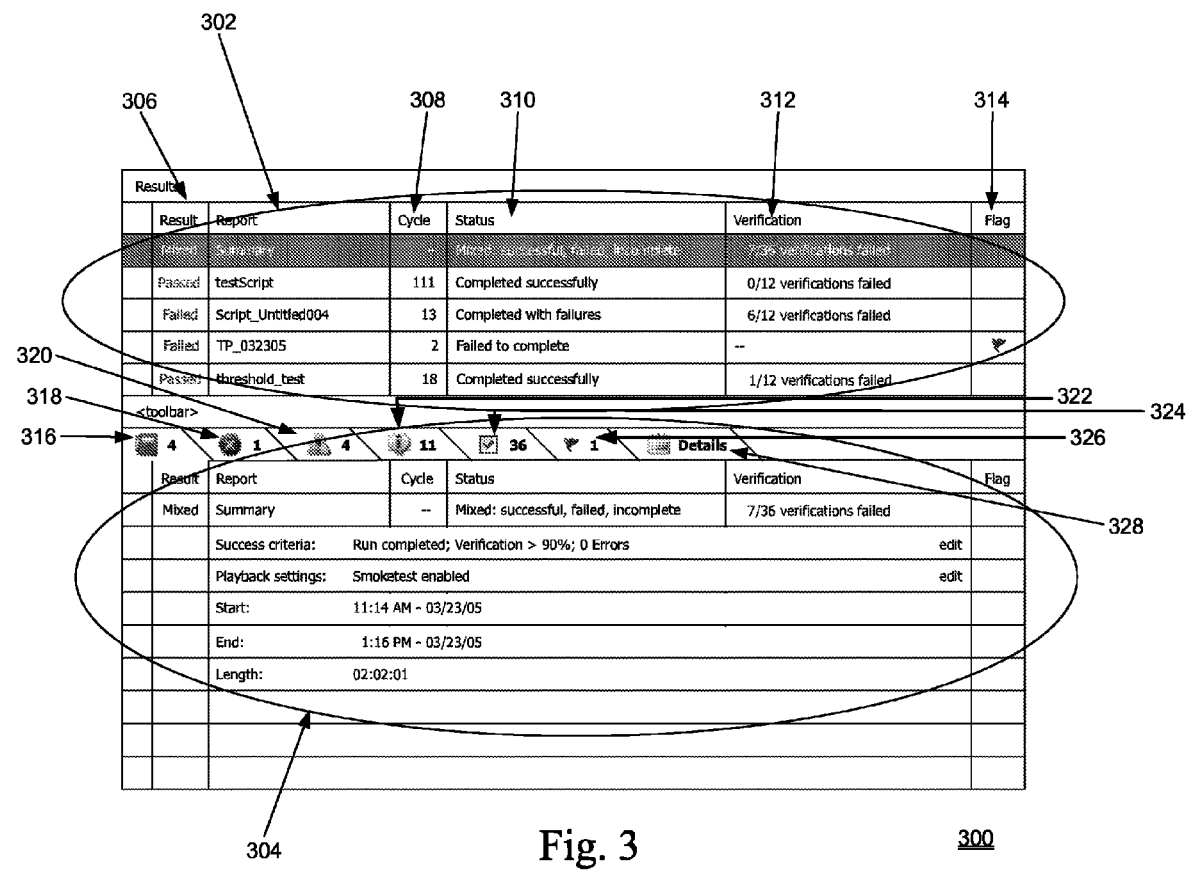
FIG. 3 illustrates a results window which provides users with a broad understanding of the results of the transactions executed on the AUT, in accordance with one embodiment of the present invention.

Also in accordance with an embodiment of the present invention, FIG. 3 illustrates a results window 300 that provides users with a broad understanding of the results of the transactions they executed. It displays the results of the overall transaction; the errors, warnings, or messages generated; and the pass/fail status of any verifications performed.

The results window 300 includes a portion with a list of tests executed 302 and a context sensitive portion providing further details 304. The top portion of the window 302 provides a summary of the result of each transaction 306 (pass, fail, or potentially "mixed" for a driver that contains both passes and fails), the test cycle 308, a status 310 that briefly describes the result, the result of any verifications 312, and notation as to whether an items have been flagged for specific attention 314. The first line of the results is selected by default.

The lower portion of the window has a tabbed frame that breaks down and provides additional information related to the selected line within the results. The tabs are, in order: Summary 316, Errors 318, Warnings 320, Informationals 322, Verifications 324, Flags 326, and Details 328.

The summary tab 316 offers information about the status of the transaction, pertinent options and criteria used when executing the transaction, etc. The error tab 318 provides a list of runtime errors encountered, details about the errors, and links to help troubleshoot the errors. The warnings tab 320 provides a list of any issues encountered that the tool was able to recover from, for example a runtime error that the tool handled, details about the situation, and links to resolve the situation that triggered the warning. The informational tab 322 provides a list of any less critical issues or comments logged, and details about the issue. The verifications tab 324 provides a list of the verifications executed, distinguishes between passed and failed verifications, and provides some details about the cause of any failures. The flags tab 326 provides a list of any issues that have been flagged for additional follow-up. Issues can be flagged based on preconfigured criteria set up by the user, or can be manually flagged by the user during a review of the results (for review by a more experienced user, for example). Each tab contains a number that identifies how many of each item are present (e.g.—1 error 318, 4 warnings 320, etc).

As shown in FIG. 4, the tabbed pane is context sensitive: If the user selects a different line 400 in the top results window 302, the numbers on each tab 402 and the data within each pane 304 are updated to reflect information appropriate to the selected transaction.

Figure 5:
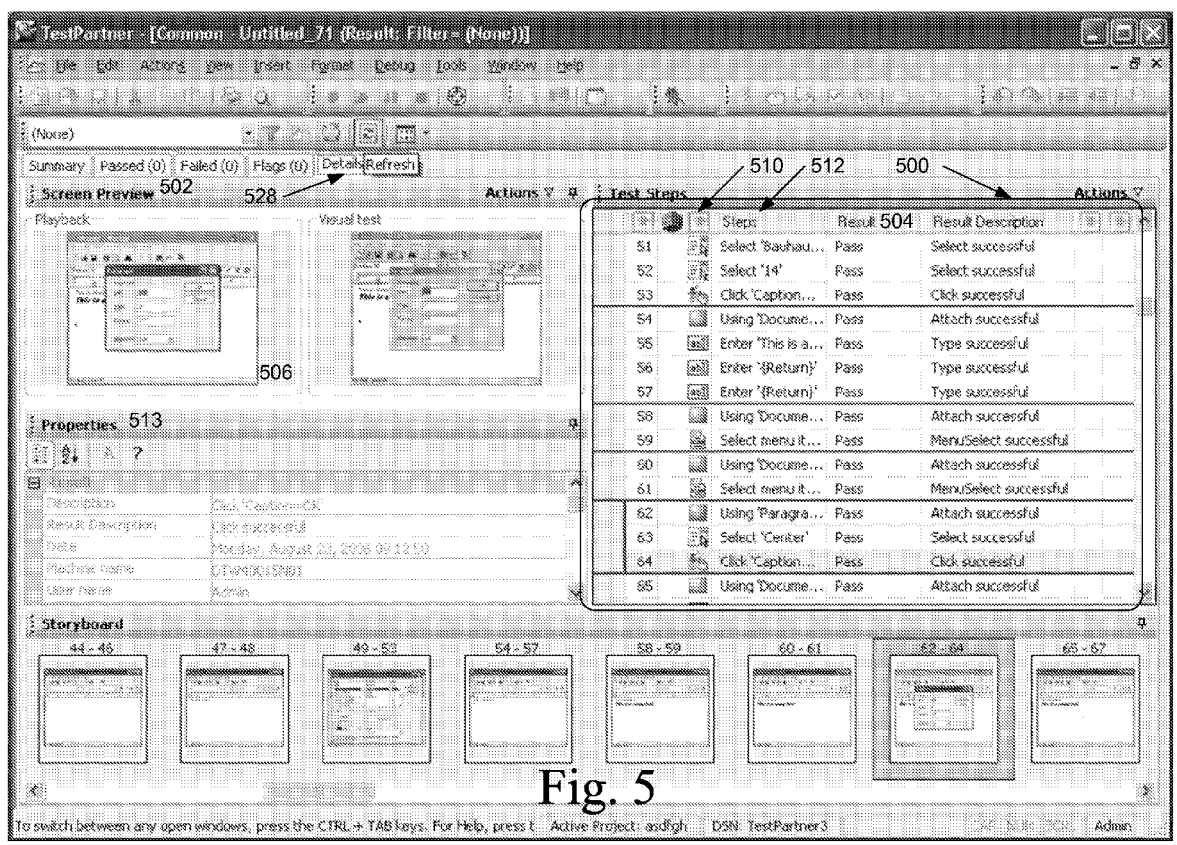
FIG. 5 illustrates the results window when the details tab is selected, including a log of results that can be viewed in conjunction with the Application Window to show the actual controls automated, in accordance with one embodiment of the present invention.

The details tab 328 focuses on the technical success or failure of each command and any details associated with the command. As shown in FIG. 5, when the details tab is selected, it shows a result 500 that can be viewed in conjunction with the Application Window 502 to show the actual controls 510 that were automated. Therefore, in addition to providing information about each step executed 512 in the transaction, the details tab offers the user with a visual link between the results 504 and the application under test 506. To facilitate this approach, the same "Application Window" 502 used in creating a test is also used to present a screenshot of each window that was automated during execution 506. Similarly, the properties window 513 is the same format as was used when the test began, displaying the attributes of any items the user selects. In addition, the same "Storyboard Window" used in creating a test is also used to present a visual sequence of windows being automated, as well as numeric data that provides the relationship between each window and the recorded actions. This allows the user to have a more visual understanding of the automation.

In addition to showing each step in the transaction, the Details tab provides information about the result of the step 504 (e.g.—did it result in an error, a warning, etc). For situations where a verification fails or an error is encountered, the system offers a description of the cause 508. Because there is a visual link between the Details tab 528 and the Application Window 502, users can scroll through the numbered list of actions 500, and the applicable control within the Application Window 502 is highlighted. This allows the system to demonstrate the entire sequence of actions to the user from both a textual and visual standpoint.

For ease of viewing, the system allows a user to filter results. Filter criteria include whether a given check was passed or failed, user and events. In some embodiments, additional filter criteria are provided.

In some embodiments, users can choose to view a session as it is running rather than waiting for the transaction log. By clicking on a window, the data the window displays will be updated in real time as the application runs.

Task Based Interface

Referring again to FIG. 6, in a preferred embodiment the system is controlled from a task based interface called "Start Screen" 601. Novice users are task oriented, and so they often need guidance in determining what they want to do with the tool. There are a limited number of basic tasks that users, and especially novice users, perform when creating a transaction. The system disclosed herein provides users with a goal oriented approach they understand by identifying common tasks. It also provides users with structure by offering a defined set of tasks that they can choose from.

The initial task based interface, called the Start Screen, includes a limited selection and a limited variety of tasks to perform, since novice users in general only undertake a handful of "higher level" tasks. The initial Start Screen interface, the embodiment illustrated in FIG. 6, is broken down to provide the following options: (1) Visual tests 602; (2) Tasks 604; (3) Flags 606; (4) Help 608. The Visual tests area 602 provides the user with the choice to record new tests or open existing tests. In a preferred embodiment, a list of recent tests is displayed for the user's convenience. The Tasks area 604 lists for the user a number of the more common tasks the user might wish to choose. The Flags area 606 provides a convenient location for the user to see which recent results have been flagged for special attention. The Help 608 area provides for a variety of help and support options including: (1) A tour of the program; (2) Recording, modifying, and managing visual tests; (3) Reviewing results; (4) An index of help topics; (5) View sample visual tests; (6) A section to help the user understand the test steps; (7) Visit technical support, known as Compuware Frontline; (8) Visit the Compuware website.

Once the user is in a particular context, other tasks are presented through the menu, toolbar, and help system. So, for example, when a user is editing a Visual test, the Properties window allows the user to "variabilize data" or "add test data". Adding "verification" and "synchronization" is achieved through the menu options. Similarly, when viewing a result, the Properties window allows the user to "review passed and failed checks", "analyze a script failure", "show execution summary", or "export results". In other embodiments, different sets of choices are presented to the user.

In addition, rather than waiting for a help request, the system presents features in a manner that allows the user to explore what is available. For example the Properties window shows the items that affect the execution of a Test step; items within the window allow the user to change the behavior by selecting appropriate action, and the Properties window displays help information to assist the user in their selection. Hence, the preferred embodiment provides users with a list of common actions, explained in plain non-technical language, for the screen that that they are currently using. In addition, the system shows users how to perform a particular task though the help system, as detailed above.

Test Logic Designer

Figure 7:
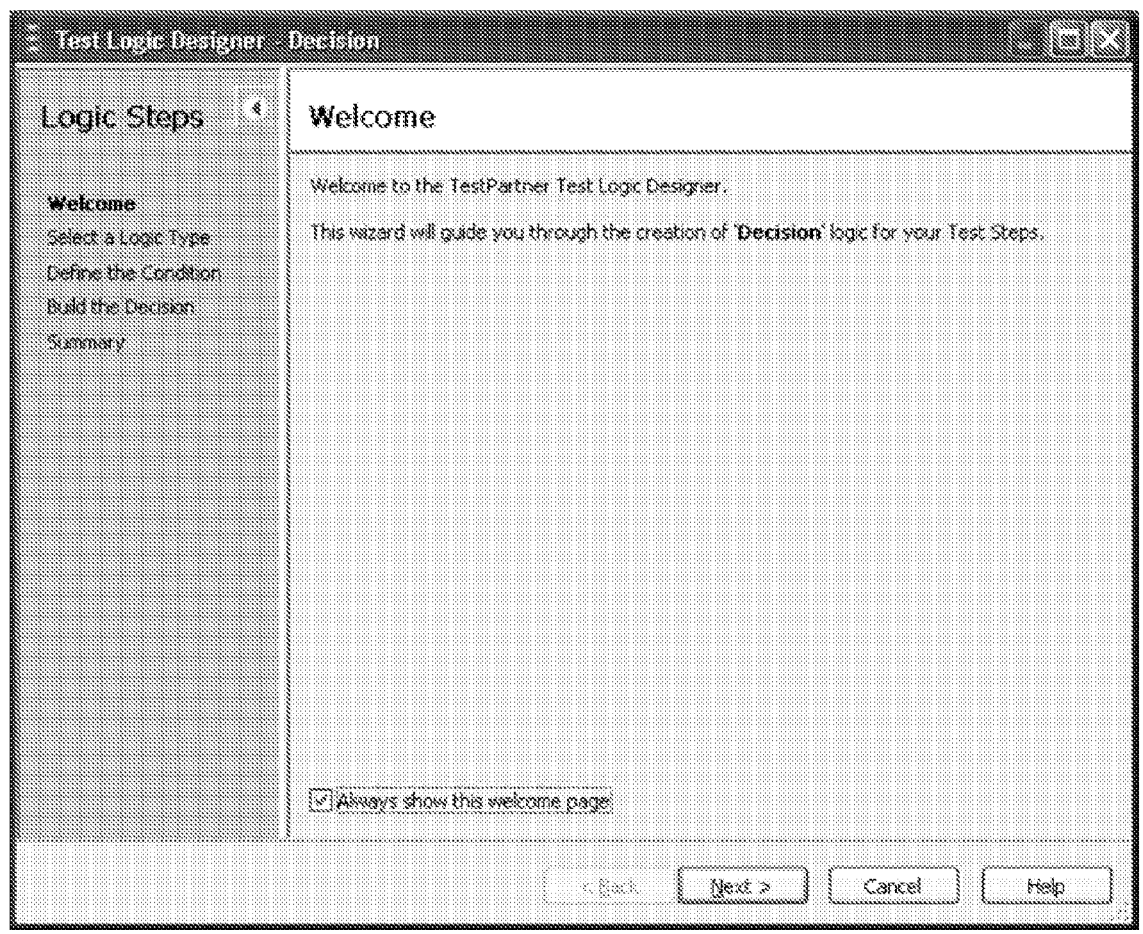
FIG. 7 illustrates an initial screen of a Test Logic Designer that allows users to simply perform a variety of logic functions in accordance with one embodiment of the present invention.

Referring now to FIG. 7, the Test Logic Designer 700 enables novice users to add logic, including verification and synchronization, to their transactions without having to understand programming concepts. The Logic Builder uses a wizard interface to allow the user to define the task they want to accomplish. As the user makes choices, the options are narrowed down accordingly until the user action is clearly defined, including parameterization options. As noted above, novice level users are task oriented. Novice users know what they want to do, even if they do not necessarily understand how to do it in a deeply technical manner. The Test Logic Designer describes tasks in plain, non-technical language through a list of actions and methods to ensure that the user does not need a technical background in order to use the software.

With the Test Logic Builder, users are able to simply perform a variety of logic functions. Users can create loops that repeat a section of the automated test based on a condition. Users are able to branch to other sections of the test based on a condition. Users are also able to create expressions using a combination of keywords, operators, variables, or constants that can be used to perform calculations, manipulate characters, or test data.

Figure 8:
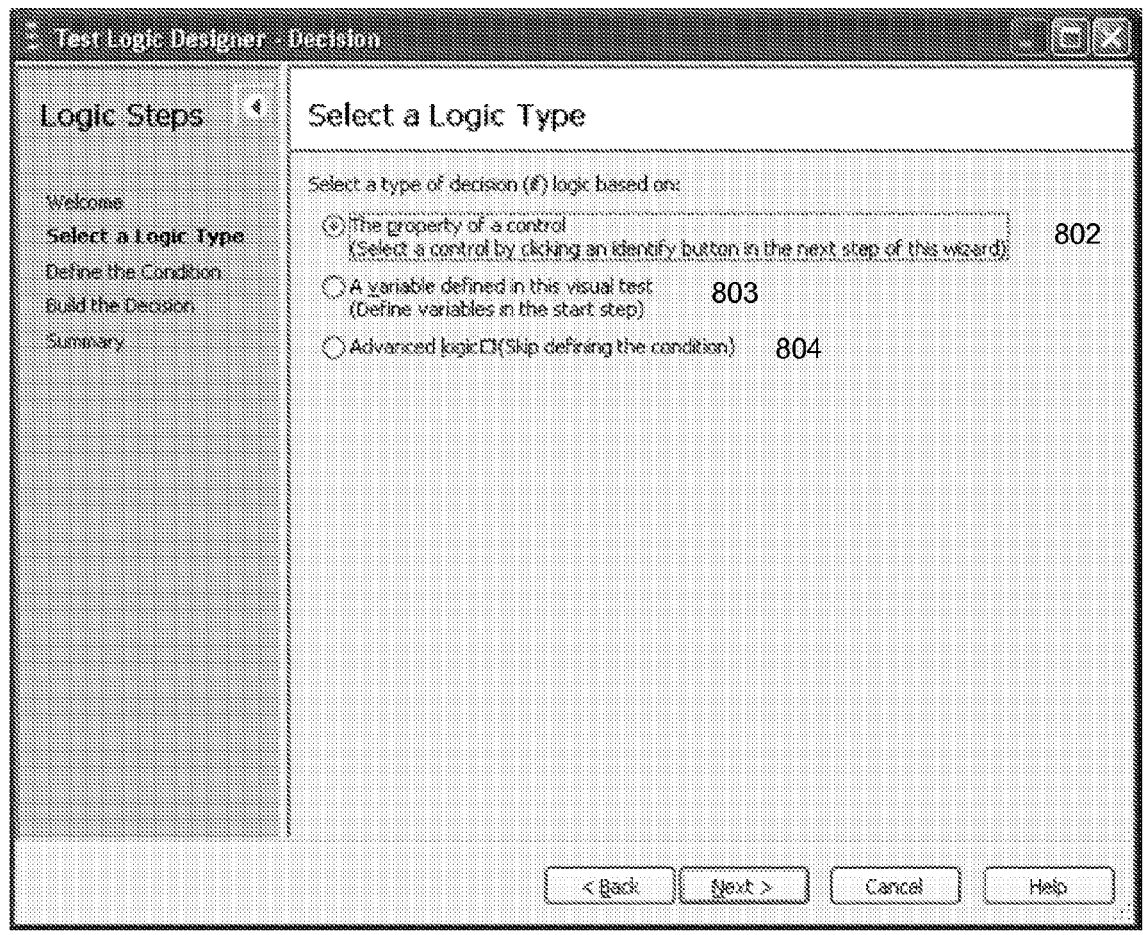
FIG. 8 illustrates a screen of the Test Logic Designer that is displayed while it is being used to create looping logic in a functional test in accordance with one embodiment of the present invention.

In order to create an IF statement, for example, upon opening the wizard, the user selects ""Build IF statement"". FIG. 8 shows the next window 800 the user comes to, called, "list of actions." Here, the user selects whether the IF statement will depend upon a property 802, a variable, 803 or a condition 804.

Figure 9:
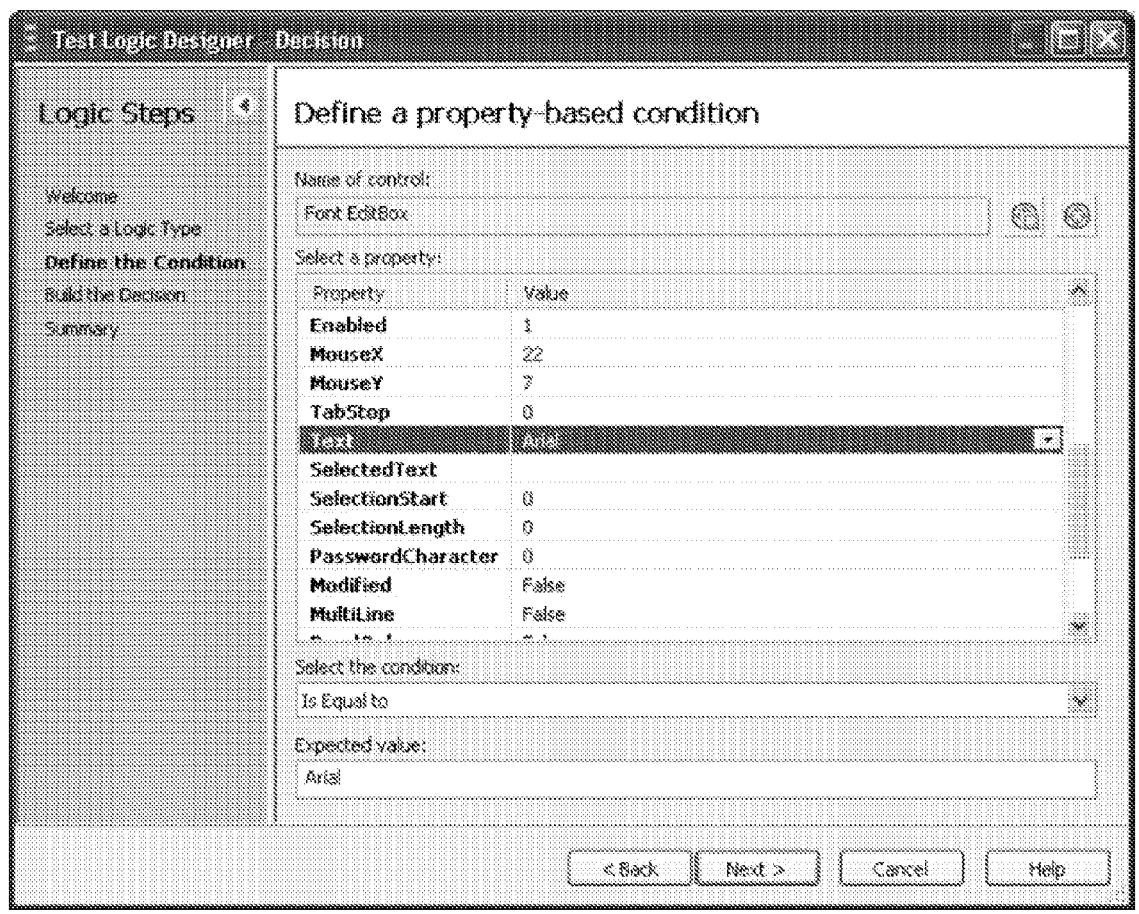
FIG. 9 illustrates a screen of the Test Logic Designer and the Action Window that is displayed while they are being used to create looping logic in a functional test in accordance with one embodiment of the present invention.
Figure 10:
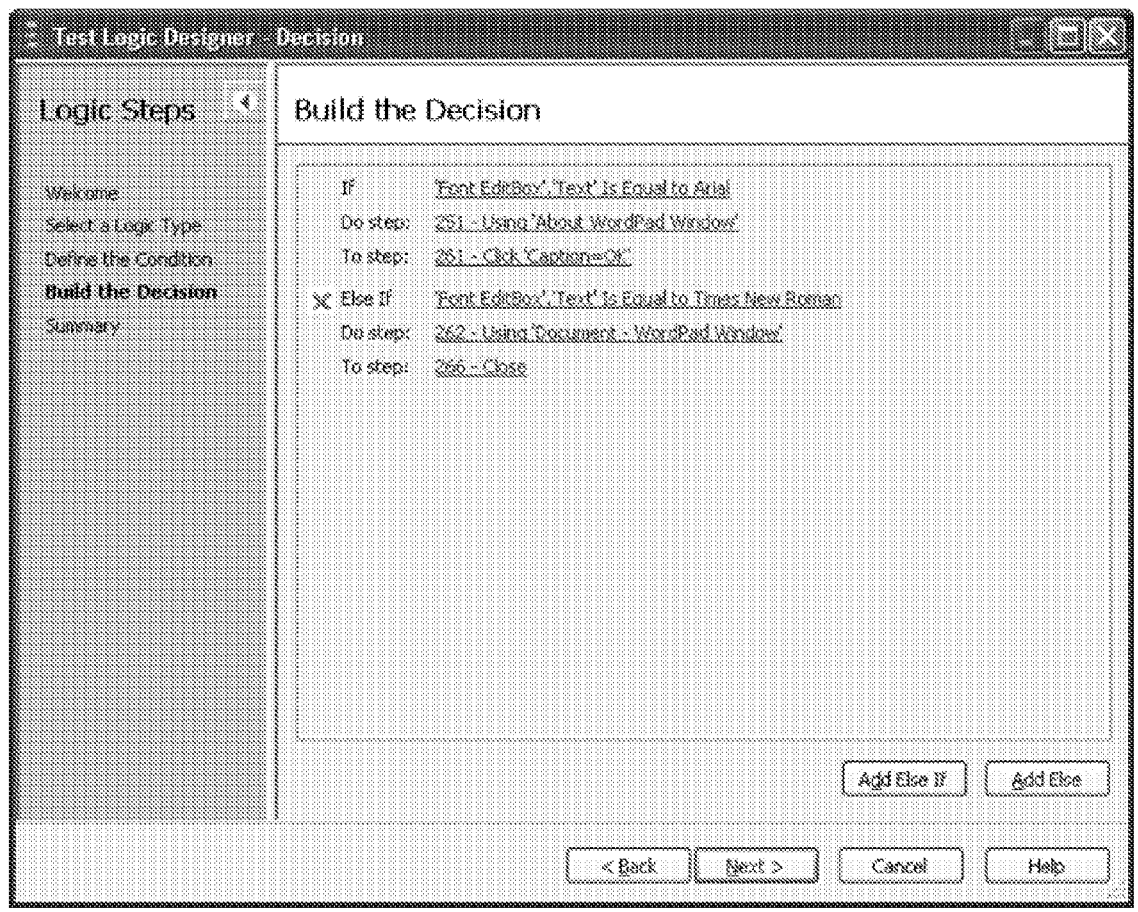
FIG. 10 illustrates a further screen of the Test Logic Designer that is displayed while it is being used to create looping logic in a functional test in accordance with one embodiment of the present invention.
Figure 11:
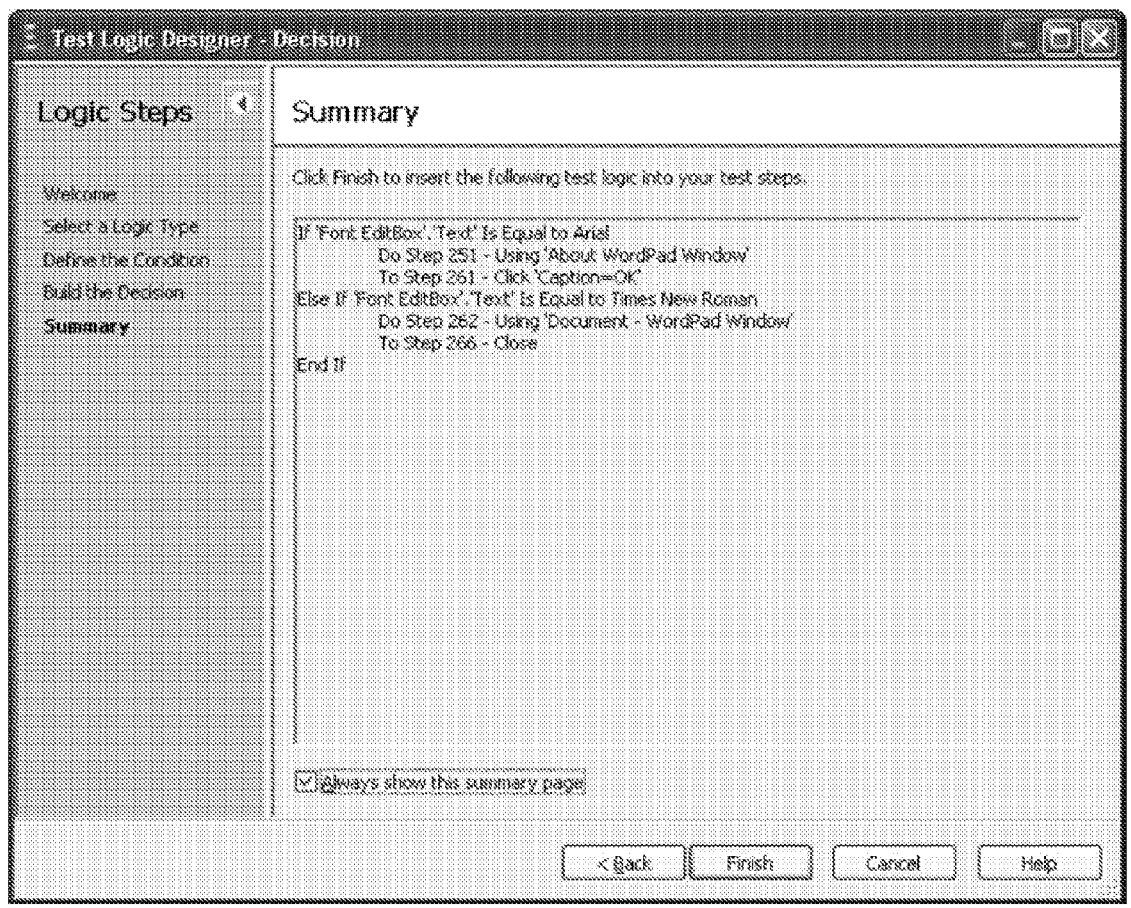
FIG. 11 illustrates a screen of the Test Logic Builder that is displayed while it is being used to create looping logic based on the value of a control property, in accordance with one embodiment of the present invention.

FIG. 9 shows the next screen 900, which in this instance is for defining a condition based on a property. In screen 900, the user names the item, the property, the condition and the value they want to use to trigger the IF statement. The next screen 1000 is shown in FIG. 10, and is called "Build the IF," where the user selects what action or actions to perform when the IF is triggered. The final screen 1100, shown in FIG. 11, is a summary of the loop the user has created.

In some embodiments, there is a Logic Builder toolbar, called "Test Logic Toolbox", that allows users to insert logic (e.g.—IF, ELSE, Loop, etc) into the transaction without the need to go through the Test Logic Designer. The toolbar further has shortcuts directly to the various steps in the Test Logic Designer.

Figure 13:
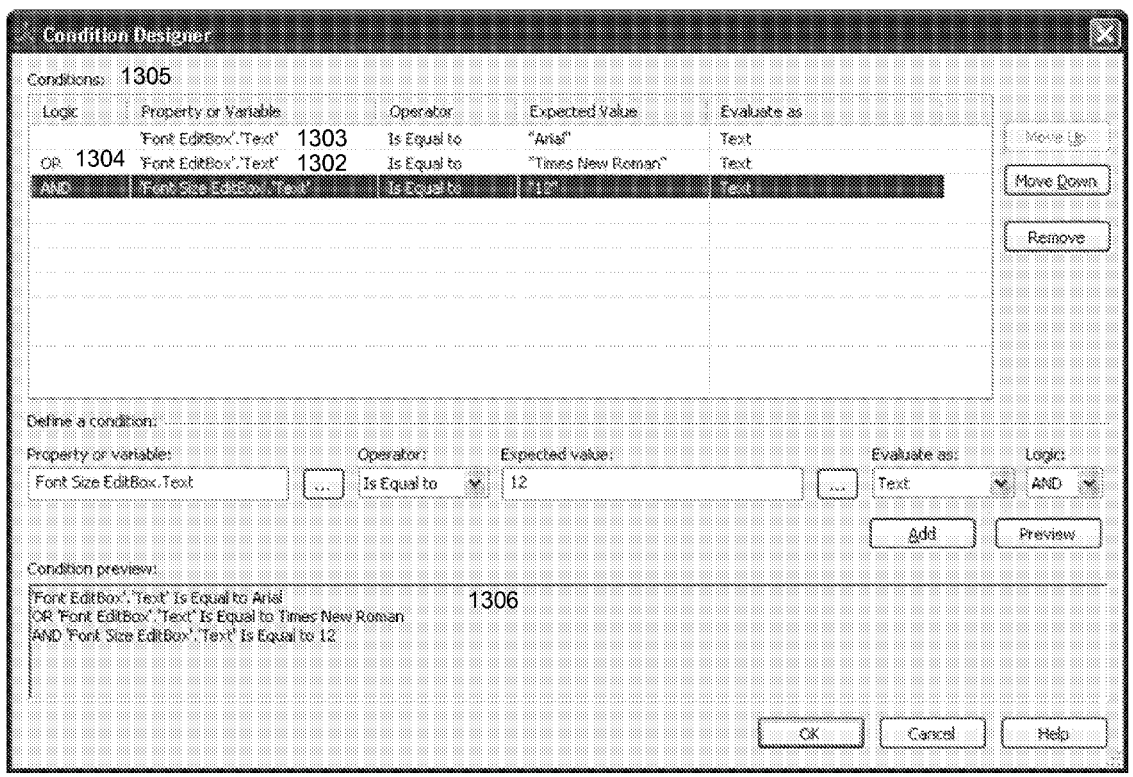
FIG. 13 illustrates a condition editor screen in accordance with an embodiment of the present invention.

FIG. 13 shows another feature of the Test Logic Builder, a conditions editor 1300, or "conditions designer," which allows users to create logical conditions separately from the Test Logic Builder screens described above. Steps in the conditions include simple variable evaluation, 1302, string manipulation 1303 and floating point conversation functions. Steps are connected with the logical operators OR and AND 1304. The condition is viewed both graphically, 1305 and as a textual narrative 1306.

FIG. 12 illustrates one embodiment of a computer system in accordance with the present invention. The computer system includes a processor 1210, a memory 1220, a storage 1230, a network interface (IF) 1240, a display interface 1250, and one or more other input/output (IO or I/O) interfaces 1260. The processor 1210, the memory 1220, the storage 1230, the network interface 1240, the display interface 1250, and the input/output interfaces 1260 are communicatively coupled through a data bus 1270.

In a preferred embodiment, the processor 1210 is a conventional processor, for example, a complex instruction set computing processor (e.g., an Intel® Pentium® processor or AMD Athlon™ processor). A reduced instruction set computing processor (e.g., an IBM® PowerPC processor or Sun® SPARC® processor), or a specialized or highly optimized processor (e.g., IBM/Toshiba/Sony Cell Processor) is usable in alternate embodiments. The processor 1210 is configured to run a conventional operating system 1280 corresponding with the processor 1210 being used, e.g., Microsoft® Windows™ or Windows CE, Linux, Lindows, Apple® OS X, IBM MVS or VM, Sun Microsystems® Solaris™, or Palm Source® Palm OS. The processor 1010 with operating system is configured to execute instructions corresponding to the steps of processes disclosed herein 1290. The processes disclosed herein 1290 perform testing and analysis operation on an application under test 1295. In one embodiment, the processes disclosed herein 1290 are stored in the storage medium 1230 of a computer, and then copied to memory 1220 during execution. The processes disclosed herein 1290 are, in a preferred embodiment, structured as instructions using conventional computer programming tools, e.g., programming languages, compilers, and the like.

The memory 1220 is a conventional memory, for example, a dynamic random access memory (DRAM), a static random access memory (SRAM), or a synchronous DRAM (SDRAM). The storage 1230 is a conventional storage medium, for example, a magnetic storage (e.g., magnetic hard drive), an optical storage (e.g., a CD or DVD based drive and medium), or solid state storage (e.g., a flash memory or electrically erasable programmable read only memory).

The network interface 1240 is a conventional network interface for connecting with a wired (e.g., Ethernet) or wireless (e.g., WiFi or other IEEE 802.11, WiMax or other IEEE 802.16, or Bluetooth) network through a communication protocol. Examples of networks that the network interface 1240 could communicatively couple include wide area networks such as an Internet or local area networks such an Intranet. An example of a communication protocol is TCP/IP. The display processor 1250 is a conventional display processor configured to drive still and motion text, images and graphics to a visual display. The input/output interfaces 1260 are conventional input/output interfaces for use with the computing system, for example, an audio interface (e.g., microphone and/or a speaker), or I/O ports such as a universal serial bus (USB) interface or an IEEE 1394 (e.g., Apple® FireWire) interface.

Upon reading this disclosure, those of skill in the art will appreciate still additional alternative structural and functional designs for a system and a process for providing a visual interface for automated software testing through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A system for testing software application, the system comprising:
   a storage medium configured to store a structure of actions to be executed by the software application and a plurality of application windows associated with the software application to be automated during a test;
   a display configured to present a visual interface of the software application comprising a plurality of components, including a graphical representation of at least one of the plurality of application windows, an action window showing at least a part of the structure of actions, a properties window showing one or more properties of a selected action, and a storyboard showing the plurality of application windows, the display operable to show the plurality of components in a single visual interface; and
   a processor operable to determine a first link between the selected action and a corresponding part of one of the plurality of components, the first link being shown on one or more of the action window, the graphical representation of the at least one of the plurality of application windows, the properties window, and the storyboard.

2. The system of claim 1, wherein the structure of actions is a list.

3. The system of claim 1, the processor further configured to determine a second link among one of the plurality of application windows, an action from the list, and at least one of the plurality of components, the second link being shown on one or more of the action window, the graphical representation of the at least one of the plurality of application windows, the properties window, and the storyboard.

4. The system of claim 1, wherein the display is further configured to present a visual interface of a result of an executed action.

5. A system for testing a software application, the system comprising:
   a display configured to present a visual interface comprising:
   a first interface portion providing a list of test steps, the first interface portion including an indication of a selected one of the test steps;
   a second interface portion providing an image of a first screen produced by the software application, the first screen corresponding to the selected one of the test steps;
   a third interface portion providing one or more properties corresponding to the selected one of the test steps; and
   a fourth interface portion providing contextual information for the first screen, the contextual information including a presentation of one or more reduced images of a set of screens relating to the test steps, the set of screens including the first screen; and
   a processor operable to determine an association among the selected one of the test steps, the first screen, and the one or more properties,
   wherein the display is operable to show a visual indication of the association in two or more of the first interface portion, the second interface portion, the third interface portion and the fourth interface portion in a single visual interface.

6. The system of claim 5, wherein the contextual information is provided as a storyboard.

7. The system of claim 5, wherein the at least one visual interface further comprises a fifth interface portion providing logic relating to the selected one of the test steps.

8. The system of claim 5, further comprising a logic wizard configured to provide a user with a visual prompt to create the test steps.

9. The system of claim 5, further comprising a logic conditions designer configured to provide a user with a textual and non-textual representation of one or more conditions relating to the test steps.

10. The system of claim 5, wherein the first interface portion is configured to be visually editable by a user.

11. The system of claim 5, wherein the first interface portion is configured to provide for modification of an existing test transaction.

12. The system of claim 5, wherein the first interface portion is configured to provide for addition of test data.

13. The system of claim 5, further comprising a start screen providing a plurality of visual prompts to a user, the plurality of visual prompts including a first prompt to record a new visual test, a second prompt to open an existing visual test, and a third prompt to perform one of a set of common tasks.

14. A method for testing a software application, the method comprising:
   presenting on a display a first interface portion providing a list of test steps, the first interface portion including an indication of a selected one of the test steps;
   presenting on the display a second interface portion providing an image of a first screen produced by the software application, the first screen corresponding to the selected one of the test steps;
   presenting on the display a third interface portion providing one or more properties corresponding to the selected one of the test steps;
   presenting on the display a fourth interface portion providing contextual information for the first screen, the contextual information including a presentation of one or more reduced images of a set of screens relating to the test steps, the set of screens including the first screen; and determining an association among at least two of the selected one of the test steps, the first screen, and the one or more properties, wherein the display is operable to show a visual indication of the association in two or more of the first interface portion, the second interface portion, the third interface portion and the fourth interface portion in a single visual interface.

15. The method of claim 14, wherein the contextual information is provided as a storyboard.

16. The method of claim 14, further comprising providing logic relating to the selected one of the test steps.

17. The method of claim 14, further comprising providing a visual prompt for creation of the test steps.

18. The method of claim 14, further comprising providing a logic conditions designer being configured to provide a user with a textual and non-textual representation of one or more conditions relating to the test steps.

19. The method of claim 14, further comprising visually editing information within the first interface portion.

20. The method of claim 14, further comprising modifying an existing test transaction using the first interface portion.

21. The method of claim 14, further comprising adding test data using the first interface portion.

22. The method of claim 14, further comprising providing a plurality of visual prompts to a user, the plurality of visual prompts including a first prompt to record a new visual test, a second prompt to open an existing visual test, and a third prompt to perform one of a set of common tasks.

23. A non-transitory computer-readable medium bearing a sequence of computer-executable instructions for testing a software application, the sequence of instructions enabling a computer to perform the steps of:

presenting on a display a first interface portion providing a list of test steps, the first interface portion including an indication of a selected one of the test steps;

presenting on the display a second interface portion providing an image of a first screen produced by the software application, the first screen corresponding to the selected one of the test steps;

presenting on the display a third interface portion providing one or more properties corresponding to the selected one of the test steps;

presenting on the display a fourth interface portion providing contextual information for the first screen, the contextual information including a presentation of one or more reduced images of a set of screens relating to the test steps, the set of screens including the first screen; and determining an association among at least two of the selected one of the test steps, the first screen, and the one or more properties, wherein the display is operable to show a visual indication of the association in two or more of the first interface portion, the second interface portion, the third interface portion and the fourth interface portion in a single visual interface.

* * * * *